United States Patent Office 2,830,046
Patented Apr. 8, 1958

2,830,046

NEW SERIES OF N-(5-NITRO-2-FURFURYLIDENE)-3-AMINO-2-THIOOXAZOLIDONES

Kenyon J. Hayes, Norwich, N. Y., assignor to The Norwich Pharmacal Company, Norwich, N. Y., a corporation of New York No Drawing. Application September 8, 1955
Serial No. 533,249

4 Claims. (Cl. 260—240)

This invention relates to a new series of chemical compounds which have proved of therapeutic value. The series includes a number of closely related N-(5-nitro-2-furfurylidene)-3-amino-2-thiooxazolidones represented by the general formula:

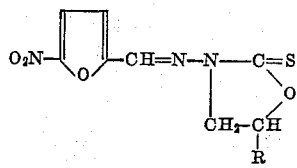

wherein R represents a member of the group consisting of hydrogen, alkyl and dialkylamino methyl.

I have discovered that the members of my new series of chemical compounds exhibit extraordinary activity against protozoa such as *Endamoeba histolytica*, *Trichomonas vaginalis* and *Trichomonas foetus* and against trypanosomes. For instance, members of my new series exhibit effectiveness against *Endamoeba histolytica* and *Trichomonas foetus* at the astonishingly low concentration of 1 part of compound per 125,000 parts of test media, while they exhibit effectiveness against *Trichomonas vaginalis* at the amazingly low concentration of 1 part of compound per 500,000 parts of test media. My new compounds may, therefore, be used with particular advantage in the treatment of amoebiasis by virture of their effectiveness against *Endamoeba histolytica*, in combatting abortion in cattle by virtue of their effectiveness against *Trichomonas foetus*, and in the therapy of vaginitis by virtue of their effectiveness against *Trichomonas vaginalis*, all of which have posed serious health problems in the past. I have discovered also, that members of my new series of compounds possess remarkable in vivo chemotherapeutic activity when administered perorally to animals lethally infected with trypanosomes. For instance, the administration, in sub-toxic quantities, of members of my new series of compounds to animals lethally infected with *Trypanosoma cruzi*, which causes the South American form of trypanosomiasis commonly known as Chagas' disease and for which there has been no satisfactory therapy heretofore, has produced excellent results.

The formulation of a pharmaceutical preparation containing a member of my new series of compounds as active therapeutic agent may be very readily accomplished. The compound selected may be incorporated in conventional fashion in gelatin capsules, suspensions, tablets or lozenges. Thus, in the preparation of a tablet, the selected compound can be granulated with standard starch paste and dried, then dry starch is added thereto and tablets are pressed out. In the case of lozenges, the selected compound can be granulated with sugar syrup, bulk may be provided through powdered sugar and dry starch and a flavoring material may then be added thereto.

The quantity of a selected member of my new series of compounds which may be incorporated for effective dosage in the formulation of a therapeutic preparation is well below the toxic level and such dosages when administered orally are tolerated very well; for example, in mice a peroral $LD_{50}$ within the range of 1,200–5,000 mg./kg. has been observed.

The method which I now prefer to follow in preparing the members of my new series of compounds comprises condensing a suitable 3-amino-2-thiooxazolidone with 5-nitro-2-furaldehyde or its reactive derivatives such as 5-nitro-2-furaldehyde diacetate. In connection therewith, I have found that it is advantageous to prepare, as a starting material, a condensation product of 3-amino-2-thiooxazolidone with an aldehyde or ketone which provides a group that can be exchanged readily by a 5-nitro-2-furaldehyde group and then effecting such exchange. Such condensation products are exemplified by the N-salicylidene-3-amino-2-thiooxazolidones which react with 5-nitro-2-furaldehyde and its reactive derivatives.

The preparation of the intermediate, 3-amino-2-thiooxazolidone, is preferably effected by reacting a hydroxyalkyl substituted hydrazone with an agent causing ring closure to the corresponding thiooxazolidone. An especially suitable ring closure agent is thiophosgene.

In order that my invention may be entirely available to those skilled in the art, methods for making a number of the new compounds of the series are described briefly.

EXAMPLE I

*N*(5 - nitro - 2 - furfurylidene) - 3 - amino - 5 - methyl - 2-thiooxazolidone

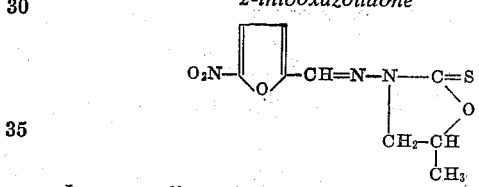

In a two liter, three neck flask fitted with a stirrer, efficient reflux condenser and dropping funnel are placed 90 grams of 2-hydroxypropyl hydrazine. 122 grams of salicylaldehyde are added, with cooling, during 5–10 minutes. After 10 minutes, a solution of 100 grams of sodium hydroxide in 500 cc. of water is added, followed by 200 cc. of carbon disulfide. The mixture is refluxed for 4 hours. At the end of this time, the excess of carbon disulfide is removed by distillation. An orange solid, crude N - (salicylidene) - 3 - amino - 5 - methyl - 2 - thiooxazolidone, 29 grams in weight, is removed by filtration from the alkaline solution. This crude material is washed with two portions (100 and 50 cc.) of water.

The alkaline filtrate and washings are combined and placed in a distillation set up fitted with a stirrer and dropping funnel. While heating in a 70° C. water bath, 20% aqueous sulfuric acid is added slowly with stirring. Carbon disulfide is liberated after 200 cc. of acid have been added and becomes negligible after 500 cc. have been introduced. The suspension of bright yellow solid is cooled to 30° C. and filtered by suction. The solid thus obtained, crude 2-salicylidene-1-(2-hydroxypropyl) dithiocarbazic acid, weighing 153 grams, is washed with water (2×200 cc.) and ethyl alcohol (300 cc. and 100 cc.).

The lead salt is prepared by dissolving 54 grams of crude 2-salicylidene-1-(2-hydroxypropyl)dithiocarbazic acid in 150 cc. of dimethylformamide which is heated to 100° C. A solution of 38 grams of lead acetate in 50 cc. of hot acetic acid is added. The heavy yellow suspension is cooled and filtered. The solid is washed with ethyl alcohol and dried. The amount of lead salt obtained is 75 grams.

The lead salt is pyrolyzed to N-(salicylidene)-3-amino-5-methyl-2-thiooxazolidone in the following manner: To a solution of 19 grams of lead acetate in 100 cc. of hot dimethylformamide in a 500 cc. round bottom flask which is fitted with an air condenser and heated in an oil bath, is added a solution in 100 cc. of dimethylformamide of 75 grams of the lead salt referred to above. The mixture is heated to reflux and held at that temperature for one hour. The precipitated lead sulfide is filtered from the solution while hot. The filtrate is diluted with 600 cc. of water and the white solid which results is collected. The filter cake is extracted with portions of boiling dimethylformamide (100 cc., 50 cc., 50 cc.) until no solid results on dilution with water. All crops of N-(salicylidene)-3-amino-5-methyl-2-thiooxazolidone thus obtained are combined, washed with water, a mixture of ether and alcohol (1:1) and then dried at 110° C. In this fashion 31.4 grams, melting point 197–198° C. are obtained.

The N-(salicylidene)-3-amino-5-methyl-2-thiooxazolidone obtained in the step above is recrystallized in portions from toluene (100 cc. per gram) using amorphous carbon such as Norite; recovery is 95%.

To convert N-(salicylidene)-3-amino-5-methyl-2-thiooxazolidone obtained as described above into N-(5-nitro-2-furfurylidene)-3-amino-5-methyl - 2 - thiooxazolidone, a mixture of 23.6 grams thereof, 16 grams of 5-nitro-2-furfural, 200 cc. of 20% aqueous sulfuric acid and 100 cc. of dimethyl-formamide is steam distilled. After 700 cc. of distillate are collected all of the salicylaldehyde has been removed. To the suspension in the still pot, 200 cc. of water are added and the flask cooled. The solid is filtered and washed three times with water. The N-(5-nitro - 2 - furfurylidene) - 3 - amino - methyl - 2 - thiooxazolidone thus obtained weighs 25 grams and has a melting point of about 224–226° C. with decomposition.

This may be recrystallized from nitromethane to yield yellow crystals which melt at 226–227° C. with decomposition.

EXAMPLE II

*N-(5-nitro-2-furfurylidene)-3-amino-2-thiooxazolidone*

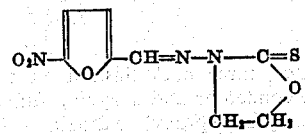

In a three neck flask fitted with a stirrer, thermometer, dropping funnel and a nitrogen inlet capillary and outlet tube are placed 19 grams of hydroxyethyl hydrazine. To this is added, with cooling and stirring, 143.4 cc. of acetone. The reaction medium is cooled to 4° C.; then, over a period of 11 minutes, 28.8 grams of thiophosgene in 60 cc. of acetone are added. During this time nitrogen was bubbled through the reaction medium to promote the removal of the HCl gas formed. The temperature of the reaction is maintained at about 15° C. When the addition is completed, the reaction medium is allowed to warm to room temperature. This temperature is maintained with stirring and cooling for 2½ hours. The acetone is removed by distillation, leaving a viscous liquid with solid suspended therein as a residue.

The residue is dissolved in 175 cc. of ethyl alcohol and to this solution are added 30 grams of 5-nitro-2-furfural dissolved in 150 cc. of ethyl alcohol. A yellow solid is formed which, after cooling, is filtered and washed with ethyl alcohol and ether. A yield of 18 grams of N-(5-nitro-2-furfurylidene)-3-amino-2-thiooxazolidone, having a M. P. of 254–255° C. is obtained.

EXAMPLE III

*N-(5-nitro-2-furfurylidene)-3-amino-5-dimethylaminomethyl-2-thiooxazolidone*

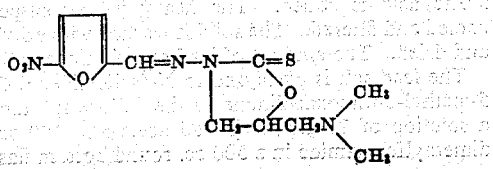

In a three neck flask fitted with a stirrer, thermometer, dropping funnel and a nitrogen inlet capillary and outlet tube are placed 20 grams of 1-hydrazino-3-dimethylamino-2-propanol. With cooling and stirring, 106 cc. of acetone is added. This mixture is cooled to 4° C., stirred, and, with nitrogen bubbling through, 17 grams of thiophosgene dissolved in 40 cc. of acetone are added dropwise over a period of 11 minutes. The temperature is kept below 17° C. during the addition of thiophosgene. When this is complete, the reaction medium is allowed to come to room temperature and maintained at such temperature for about three hours. The acetone is removed by distillation leaving a thick, viscous residue.

The viscous residue is dissolved in 140 cc. of ethyl alcohol and to this is added a solution containing 20 grams of 5-nitro-2-furfural dissolved in 100 cc. of ethyl alcohol. To this solution is added an equal volume of water and then the solution is slowly made alkaline with sodium bicarbonate. A solid precipitates which is filtered and washed well with water, ethyl alcohol and ether. The yield of solid is 13 grams; which, when recrystallized from nitro-methane, has a M. P. of 191–193° C.

What I claim is:

1. A new chemical compound having therapeutic activity and represented by the formula:

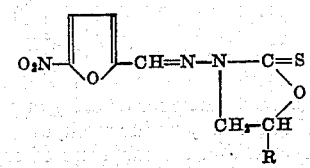

in which R represents a member of the group consisting of hydrogen, alkyl and dialkylamino methyl.

2. N - (5 - nitro - 2 - furfurylidene) - 3 - amino - 5 - methyl-2-thiooxazolidone represented by the formula:

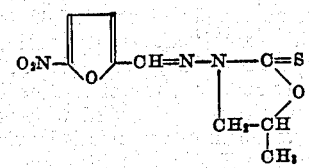

3. N - (5 - nitro - 2 - furfurylidene) - 3 - amino - 2 - thiooxazolidone represented by the formula:

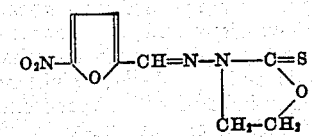

4. N - (5 - nitro - 2 - furfurylidene) - 3 - amino - 5 - dimethyl - aminomethyl - 2 - thiooxazolidone represented by the formula:

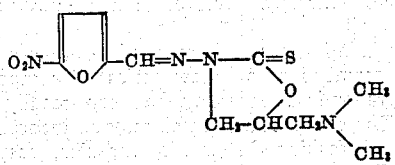

References Cited in the file of this patent

UNITED STATES PATENTS

| | | |
|---|---|---|
| 2,610,181 | Hayes | Sept. 9, 1952 |
| 2,742,462 | Gever | Apr. 17, 1956 |
| 2,746,960 | Gever | May 22, 1956 |

FOREIGN PATENTS

| | | |
|---|---|---|
| 639,559 | Great Britain | June 28, 1950 |